US006194082B1

(12) United States Patent
Sawada et al.

(10) Patent No.: US 6,194,082 B1
(45) Date of Patent: Feb. 27, 2001

(54) SUPPORT FOR LITHOGRAPHIC PRINTING PLATE

(75) Inventors: Hirokazu Sawada; Hirokazu Sakaki, both of Shizuoka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/407,960

(22) Filed: Sep. 29, 1999

(30) Foreign Application Priority Data

Oct. 1, 1998 (JP) ........................................ 10-280031

(51) Int. Cl.[7] ........................ B22D 25/00; B22D 27/00; B32B 5/14; B32B 7/10; B41N 1/04

(52) U.S. Cl. ..................... 428/610; 428/687; 428/472.2; 101/459; 420/551; 420/552; 420/550; 420/548; 420/529; 420/528; 420/537; 420/538

(58) Field of Search .................................. 420/551, 552, 420/550, 548, 529, 528, 537, 538; 428/610, 687, 472.2; 101/459

(56) References Cited

U.S. PATENT DOCUMENTS 5,795,541 * 8/1998 Tanigawa et al. .

* cited by examiner

*Primary Examiner*—Deborah Jones
*Assistant Examiner*—Wendy Boss
(74) *Attorney, Agent, or Firm*—Burns, Doane, Swecker & Mathis, LLP

(57) ABSTRACT

A support for a lithographic printing plate in which uniform pits are efficiently formed by electrochemically graining treatment, always independently of electrolytic conditions to give excellent printing performance, which comprises an aluminum alloy plate containing 0.05% to 0.5% by weight of Fe, 0.03% to 0.15% of Si, 0.006% to 0.03% by weight of Cu and 0.010% to 0.040% by weight of Ti, wherein the Cu concentration of a surface layer portion of from a surface to a depth of 2 $\mu$m of the aluminum alloy plate is at least 20 ppm higher than that of a region deeper than the surface layer portion.

3 Claims, No Drawings

SUPPORT FOR LITHOGRAPHIC PRINTING PLATE

FIELD OF THE INVENTION

The present invention relates to a support for a lithographic printing plate, and particularly to a support for a lithographic printing plate in which electrolytically graining (surface roughened) pits are uniformly and efficiently formed by electrochemically graining treatment (i.e., electrochemically surface roughening treatment) to give excellent printing performance.

BACKGROUND OF THE INVENTION

Previously, aluminum alloy plates have been used as supports for lithographic printing plates, and graining treatment is applied to the aluminum alloy plates for imparting adhesion with light-sensitive layers and water retention of non-image areas. A method of the graining treatment (i.e., the surface roughening treatment) hitherto known include mechanically graining processes such as ball graining and brush graining, electrochemically graining processes of electrolytic solutions mainly composed of hydrochloric acid or nitric acid, and electrochemically graining processes of etching a surface of aluminum alloy plate with acid solutions. In recent years, a combination of the electrochemically graining processes and other graining processes has come to constitute the mainstream, because the roughened surfaces obtained by the electrochemically graining processes have homogeneous pits (unevenness) and are excellent in printing performance.

However, even the electrochemically graining treatment is low in treating efficiency or produce the difference in the forming state of pits to cause failure to obtain homogeneous roughened surfaces in some cases, depending on the aluminum alloy plates used.

Then, for improving the efficiency of electrochemically graining treatment and equalizing roughened surfaces, the aluminum alloy composition has been variously studied. For example, JP-A-9-316582 (the term "JP-A" as used herein means an "unexamined published Japanese patent application publication") discloses an aluminum alloy plate containing 0.02% to 0.6% by weight of Fe, 0.03% to 0.1% by weight of Si, 0.04% to 0.1% by weight of Zn and 0.03% by weight or less of Cu, and having a concentration ratio of Zn to Fe (Zn/Fe) of 0.2 or more. Further, JP-A-9-279272 discloses an aluminum alloy plate containing 0.02% to 0.6% by weight of Fe, 0.03% to 0.15% by weight of Si, 0.005% to 0.05% by weight of Ti and 0.005% to 0.20% by weight of Ni, and an intermetallic compound of the above-mentioned elements having 20% to 30% by weight of Ni in addition to Al. Furthermore, JP-A-3-177528 discloses an aluminum alloy plate containing 0.03% to 0.30% by weight of Si, 0.1% to 0.5% by weight of Fe, 0.001% to 0.03% by weight of Cu, 0.005% to 0.002% by weight of Ga, 0.001% to 0.03% by weight of Ni and 0.002% to 0.05% by weight of Ti.

The alloy composition of surface layer portions (regions of from a surface to a depth of about several micron meters) of aluminum alloy plates has also been studied. For example, JP-A-10-204567 discloses an aluminum alloy plate containing 0.20% to 0.6% by weight of Fe, 0.03% to 0.15% by weight of Si and 0.005% to 0.05% by weight of Ti, wherein the Si concentration of a surface layer portion of from a surface to a depth of 3 μm is 0.01% to 0.17% higher than that of the whole plate, and the surface layer portion contains 0.05% to 0.2% by weight of Si.

However, when the aluminum alloy compositions are specified as described above, it is necessary to add effective elements such as Zn and Ni in large amounts for obtaining the desired effects. Further, the necessity of adding plural kinds of elements causes increased cost. Furthermore, when the Si concentration of the surface layer portions of the aluminum alloy plates is increased, ink stains are liable to occur in non-image areas to raise a problem with regard to image quality.

Further, in the electrochemically graining treatment, the size, form and distribution of pits formed varies depending on electrolytic conditions such as supply electrical quantity, so that it is also necessary to strictly regulate and control the optimum electrolytic conditions.

SUMMARY OF THE INVENTION

In view of such situations, the present invention has been made, and an object of the present invention is to provide a support for a lithographic printing plate in which uniform pits can be efficiently formed by electrochemically graining treatment, always independently of electrolytic conditions to give excellent printing performance.

The above-mentioned object is attained by a support for a lithographic printing plate of the present invention comprising an aluminum alloy plate containing 0.05% to 0.5% by weight of Fe, 0.03% to 0.15% of Si, 0.006% to 0.03% by weight of Cu and 0.010% to 0.40% by weight of Ti, wherein the Cu concentration of a surface layer portion of from a surface to a depth of 2 μm of the aluminum allowy plate is at least 20 ppm higher than that of a region deeper than the above-mentioned surface layer portion.

In the support for a lithographic printing plate of the present invention, the aluminum alloy plate used has the specified alloy composition, and the Cu concentration of the surface layer portion is at least 20 ppm higher than that of the region deeper than the surface layer portion. Accordingly, reaction starting points of the pitting reaction in the electrochemically graining treatment are sparsely dispersed, and even if the pitting reaction is continued to proceed, the growth of pits exceeding the necessity is inhibited to form uniform pits, because the Cu concentration is low in the region deeper than the surface layer portion. Moreover, such inhibition of the growth of pits is similarly performed, independently of electrolytic conditions.

DETAILED DESCRIPTION OF THE INVENTION

The present invention will be described in detail below.

In the supports for lithographic printing plates of the present invention, Fe is added in an amount of 0.05% to 0.5% by weight. Fe greatly exerts an influence on the strength of the supports. Accordingly, a content of less than 0.05% by weight results in the liability of plate breakage when the supports are attached as the lithographic printing plates to plate cylinders of printing machines (i.e., printing press), because of too low the mechanical strength thereof. In particular, when the mechanical strength is regarded as important, the Fe content is preferably 0.2% or more by weight.

On the other hand, a content of more than 0.5% by weight results in high strength exceeding the necessity to lead to poor fitness in attachment to plate cylinders of printing machines as the lithographic printing plates, which unfavorably causes the liability of plate breakage in printing. The preferred upper limit is 0.4% by weight. However, in the case of printing plates used for proof printing, the restrictions in terms of these fitness and strength become unimportant.

Si is contained in an Al base metal, a raw material, as an inevitable impurity, so that it is often intentionally added in trace amounts for preventing the variation due to the difference in content between raw materials. In that case, it has been known that too high the Si content results in the increased ration of Si existing in the form of the single substance Si, which causes ink stains to be liable to occur in non-image areas of the printing plates. In the present invention, when the Si content exceeds 0.15% by weight, the non-image areas become liable to stain.

On the other hand, 0.03% or more by weight of Si is already contained according to the raw material in some cases, a content of less than that is not realistic. Further, Si has the effect of forming Al—Fe—Si metal compounds to equalize electrolytically graining. Accordingly, a content of less than 0.03% by weight does not provide this effect. Furthermore, for maintaining a content of less than 0.03% by weight, expensive high-purity Al base metals are required, so that this is not realistic also from this viewpoint.

Accordingly, the Si content is from 0.03% to 0.15% by weight, and preferably from 0.06% to 0.10% by weight.

Ti is an element added for making finer a crystal structure in casting than conventional one. In the present invention, Ti is added so as to give a Ti content of 0.01% to 0.04% by weight, preferably 0.015% to 0.03% by weight, in the form of an Al—Ti alloy or an Al—B—Ti alloy When the amount of Ti added exceeds 0.04% by weight, the resistance of a surface oxide film in forming pits by the electrochemically graining treatment becomes too low, which causes the disadvantage that uniform pits are not formed. On the other hand, when the amount added is less than 0.01% by weight, a cast structure is not made fine. Accordingly, even after finishing to a thickness of 0.1 mm to 0.5 mm through various steps, traces of the coarse cast structure remain, which causes the disadvantage that significantly poor appearance is developed.

Cu is a very important element in the present invention. In the electrochemically graining treatment, the dissolving reaction of Al (pitting) and the smut adhering reaction in which a component produced by this dissolution is adhered again to a dissolving reaction portion alternately occur according to the cycle of alternating current usually by allowing the alternating current to flow in an acidic electrolytic solution. This repetition can form uniform hollows (pits) on the entire surface of Al without concentration of the dissolving reaction on a specific position. However, when the amount of Cu is less than 0.006% by weight (60 ppm), the resistance of a surface oxide film in the dissolving reaction becomes too low, so that the uniform pits are not formed. When the amount exceeds 0.03% by weight (300 ppm), the resistance of a surface oxide film in the dissolving reaction conversely becomes too high, so that coarse pits are liable to be formed. The uniformity of this pit formation is an indispensable item for obtaining excellent printability.

Further, the present invention is characterized in that the Cu concentration of the surface layer portion of from a surface to a depth of 2 μm is at least 20 ppm higher than that of the region deeper than the surface layer portion. This produces reaction occurring in the electrolytic graining can be sparsely dispersed, and even if the pitting reaction proceeds, the growth of pits exceeding the necessity is inhibited on arrival at the position deeper than the surface layer portion, because the Cu concentration is low in that position. The shallower depth of the surface layer portion can inhibit the growth of the pits more early. In the present invention, therefore, the depth of the surface layer portion is preferably up to 1.5 μm.

Accordingly, in the present invention, Cu is contained in an amount of 0.006% to 0.03% by weight, preferably 0.01% to 0.025% by weight, in all regions, and the Cu concentration of the surface layer portion of from a surface to a depth of 2 μm (more preferably 1.5 μm) is at least 20 ppm, preferably at least 30 ppm higher than that of the region deeper than the surface layer portion.

In the above-mentioned alloy composition, the remainder consists of aluminum and inevitable impurities.

For obtaining the above-mentioned aluminum alloy plates, for example, the following methods can be employed.

First, aluminum alloy forging (i.e., aluminum alloy melt) adjusted to specified alloy compositions are purified by ordinary methods, and cast. In the purifying treatment, for removing unnecessary gases such as hydrogen in the forging, fluxing treatment, degassing treatment using Ar gas, Cl gas or the like, filtering using rigid media filters such as ceramic tube filters and ceramic foam filters, filters using alumina flakes or alumina balls as filter media, and glass cloth filters, or a combination of degassing and filtering is employed.

Then, the above-mentioned forging are cast. The casting methods include methods using stationary casting molds represented by DC casting methods and methods using driving molds represented by continuous casting methods, and both the methods are available.

For example, when the DC casting methods are carried out, ingots having a plate thickness of 300 mm to 800 mm can be manufactured. The ingots are cut in 1 mm to 30 mm, preferably 1 mm to 10 mm of surface layers by scalping according to ordinary methods. The amount cut can adjust the Cu concentrations of the surface layer portions and the regions deeper than them to specified values. Then, soaking treatment is conducted if necessary. When the soaking treatment is conducted, heat treatment is carried out at 450° C. to 620° C. for 1 hour to 48 hours so that intermetallic compounds are not coarsened. Shorter than 1 hours results in an insufficient effect of the soaking treatment. Then, hot rolling and cold rolling are performed to form rolled aluminum plates. The temperature at which the hot rolling is initiated is within the range of 350° C. to 500° C. Before, after or during the cold rolling, intermediate annealing treatment may be carried out. For the intermediate annealing conditions in this case, a method of heating at 280° C. to 600° C. for 2 hours to 20 hours, desirably at 350° C. to 500° C. for 2 hours to 10 hours, by use of a batch annealing furnace, or heat treatment at 400° C. to 600° C. for 360 seconds or less, desirably at 450° C. to 550° C. for 120 seconds or less, by use of a continuous annealing furnace can be employed. Heating at a temperature elevating speed of 10° C./second using a continuous annealing furnace can also make the crystal structure fine.

According to the steps up to this, the Cu concentration of the surface layer portion of the aluminum alloy plate can be increased to a concentration at least 20 ppm higher than that of the region deeper than the surface layer portion.

Then, the aluminum alloy plates finished to a specified thickness, for example, 0.1 mm to 0.5 mm, may be further improved in their plane quality with a correction apparatus such as a roller leveler or a tension leveler. Further, for slitting the plates to a specified width, the plates are also usually passed through a slitter line.

The aluminum alloy plates thus prepared are then subjected to the graining treatment for forming the supports for lithographic printing plates. As described above, the aluminum alloy plates of the present invention are suitable for the electrochemically graining treatment. It is therefore preferred that the electrochemically graining treatment is appropriately combined with mechanically graining treatment and/or chemically graining treatment, as graining treatment.

The electrochemically graining treatment easily gives fine unevenness onto the surfaces of the aluminum alloy plates, so that it is suitable for producing lithographic printing plates excellent in printability.

This electrochemically graining treatment is conducted in an aqueous solution mainly containing nitric acid or hydrochloric acid, using direct current or alternating current. Craters or honeycomb-like pits having a mean diameter of about 0.5 $\mu$m to 20 $\mu$m can be formed on the aluminum surface at an area rate of 30% to 100% by this graining treatment. The pits provided herein have the function of improving the stain resistance of a non-image area of the printing plate and printing durability.

In this electrochemically graining treatment, the electrical quantity necessary for forming sufficient pits on the surface, that is to say, the product of electric current and conducting time (i.e., time of flowing electric current), is an important condition. It is desirable from the viewpoint of energy saving that sufficient pits can be formed by less electrical quantity.

In the present invention, the Cu concentrations of the surface layer portion and the region deeper than the surface layer portion are specified as described above, thereby being able to form uniform pits, independently of electrolytic conditions, and sufficient pits even according to treatment by a small quantity of electricity.

The mechanically graining treatment combined therewith is carried out for generally giving a mean surface roughness of 0.35 $\mu$m to 1.0 $\mu$m to the surfaces of the aluminum alloy plates. In the present invention, there is no particular limitation on various conditions of this mechanically graining treatment. For example, it can be carried out according to the methods described in JP-A-6-135175 and JP-B-50-40047 (the term "JP-B" as used herein means an "examined Japanese patent publication").

Further, the chemically graining treatment can be carried out according to known methods without particular limitation.

Subsequent to the above-mentioned graining treatment, anodic oxidation treatment is usually applied for enhancing the wear resistance of the surfaces of the aluminum alloy plates. In the present invention, the anodic oxidation treatment is also preferably applied.

Electrolytes used in this anodic oxidation treatment may be any, as long as they form porous oxide films. In general, sulfuric acid, phosphoric acid, oxalic acid, chromic acid or a mixed solution thereof is used. The concentration of the electrolyte is appropriately determined depending on the kind of electrolyte. The conditions of the anodic oxidation treatment vary depending on the electrolyte used, so that they can not be specified indiscriminately. In general, however, it is proper that the concentration of the electrolyte is within the range of 1% to 80% by weight, the solution temperature is within the range of 5° C. to 70° C., the current density is within the range of 1 A/dm$^2$ to 60 A/dm$^2$, the voltage is within the range of 1 V to 100 V, and the electrolytic time is within the range of 10 seconds to 300 seconds.

For improving the stain resistance in printing, the plate may be subjected to slight etching treatment with an alkali solution after the electrochemically graining treatment and washing with water, washed with water, and desmutted with a $H_2SO_4$ solution, followed by washing with water, and may be subsequently subjected to direct current electrolysis in a $H_2SO_4$ solution to provide an anodic oxide film.

Further, hydrophilization treatment with silicates or the like may be applied as required.

The supports for lithographic printing plates of the present invention are obtained as described above. These supports have the pits uniformly formed, have no poor surfaces such as streaks and rough surface quality, and give good image quality when formed into the lithographic printing plates.

For forming the supports into the lithographic printing plates, light-sensitive materials are applied onto the surfaces thereof and dried to form light-sensitive layers. There is no particular limitation on the light-sensitive materials, and those usually employed in the light-sensitive lithographic printing plates can be used. The printing plates attachable to printing machines can be produced by exposing (i.e., drawing) images by use of lithographic films, and conducting development processing and gumming treatment. When light-sensitive layers having a high-sensitivity are provided, images can be directly exposed (i.e., drawn) using laser beams.

EXAMPLE

Examples 1 to 4 and Comparative Examples 1 to 3

Using an Al forging containing 0.3% by weight of Fe, 0.07% by weight of Si, 0.015% by weight of Cu and 0.025% by weight of Ti, and ingot was prepared by a DC casting method. A surface of the ingot was scalped by a conventional method. In this case, aluminum alloy plates used in Examples and Comparative Examples were prepared by changing the amount of scalping. From the scalping step on, soaking treatment, hot rolling treatment, cold rolling treatment, intermediate annealing treatment and correction were appropriately carried out to form the plates having a thickness of 0.24 mm. Each of the aluminum alloy plates used in Examples and Comparative Examples was first etched with a NaOH solution, and washed with water, followed by desmutting treatment with a $HNO_3$ solution. After further washing with water, electrochemically graining treatment was carried out by conducting alternating current electrolysis in a $HNO_3$ solution. After washing with water, each of the plates was desmutted with a $H_2SO_4$ solution for removing smuts generated in the electrochemically graining treatment, washed with water and dried. Then, pits were observed under a scanning electron microscope (SEM) to evaluate the uniformity thereof. For each Example and Comparative Example, the plate was subjected to graining treatment under conditions that 4 kinds of electrical quantities, 50 c/dm$^2$, 100 cm/dm$^2$, 200 c/dm$^2$ and 300 c/dm$^2$, were given in the electrochemically graining step, and the state of pits formed was examined.

A list of the respective Examples and Comparative Examples, and results of evaluation of the uniformity of pits subjected to electrochemically graining are shown in Table 1. The alloy compositions at positions of respective surface depths were confirmed using a fluorescent X-ray analyzer (RIX 3000, manufactured by Rigaku Denshi Co. in combination with an emission analyzer (PDA-5500, manufactured by Shimadzu Corp.).

TABLE 1

| | Depth From Plate Surface And Cu Concentration (wt %) | | | Electrical Quantity (c/dm$^2$) | | | |
|---|---|---|---|---|---|---|---|
| | 0–1 μm | 1–2 μm | 2–3 μm | 50 | 100 | 200 | 300 |
| Example 1 | 0.017 | 0.017 | 0.014 | ○ | ○ | ○ | ○ |
| Example 2 | 0.010 | 0.010 | 0.008 | ○ | ○ | ○ | ○ |
| Example 3 | 0.025 | 0.025 | 0.020 | ○ | ○ | ○ | ○ |
| Example 4 | 0.008 | 0.008 | 0.006 | Δ | Δ | Δ | Δ |
| Comparative Example 1 | 0.017 | 0.017 | 0.017 | ○ | Δ | Δx | x |
| Comparative Example 2 | 0.010 | 0.010 | 0.010 | ○ | ○ | Δx | x |
| Comparative Example 3 | 0.040 | 0.040 | 0.035 | x | x | x | x |

○: Uniform round pits were formed.
Δ: Somewhat non-uniform, but within the allowable range.
Δx: Non-uniform and out of the lower allowable limit.
x: Extremely non-uniform.

As is apparent from the results of Table 1, in Examples according to the present invention, very uniform pits can be formed independently of the electrical quantity of the electrochemically graining treatment.

In contrast, in Comparative Examples 1 and 2 in which although the Cu content is within the range of the present invention, the surface layer portions are not different from the regions deeper than those in Cu concentration, the pits become non-uniform with an increase in electrical quantity. Further, in Comparative Example 3 in which the difference in Cu concentration between the surface layer portion and the region deeper than that is 20 ppm or more (50 ppm), the Cu content exceeds the range of the present invention, the pits become non-uniform at every electrical quantity.

In the above-mentioned Examples, examples are shown in which only the electrochemically graining treatment was carried out as graining treatment (i.e., surface roughening treatment). However, the present invention is not limited to the above-mentioned examples. For example, it goes without saying that a combination of the electrochemically graining treatment with the mechanically graining treatment or the chemically graining treatment also gives a similar effect.

As described above, according to the present invention, the supports for lithographic printing plates in which uniform pits are formed, always independently of electrolytic conditions in the electrochemically graining treatment (i.e., electrochemically surface roughening treatment), to give excellent printing performance are obtained by specifying the difference in Cu concentration between the surface layer portions and the regions deeper than those, as well as the alloy composition.

While the invention has been described in detail and with reference to specified embodiments thereof, it will be apparent to one skilled in the art that various changes and modifications can be made therein without departing from the spirit and scope thereof.

What is claimed is:

1. A support for a lithographic printing plate comprising an aluminum alloy plate containing 0.05% to 0.5% by weight of Fe, 0.03% to 0.15% by weight of Si, 0.006% to 0.03% by weight of Cu and 0.010% to 0.040% by weight of Ti, wherein the Cu concentration of a surface layer portion of from a surface to a depth of 2 μm of the aluminum alloy plate is at least 20 ppm higher than that of a region deeper than said surface layer portion.

2. The support for a lithographic printing plate as claimed in claim 1, wherein said Cu concentration of a surface layer portion of from said surface to a depth of 1.5 μm of the aluminum alloy plate is at least 30 ppm higher than that of a region deeper than said surface layer portion.

3. The support for a lithographic printing plate as claimed in claim 1, wherein said Cu is contained in an amount of 0.01% to 0.25% by weight.

* * * * *